(12) United States Patent
Sasaki

(10) Patent No.: US 11,255,403 B2
(45) Date of Patent: Feb. 22, 2022

(54) ORIFICE MEMBER PLACING TABLE, ORIFICE MEMBER PLACING METHOD, AND LIQUID-SEALED VIBRATION-PROOF MOUNT MANUFACTURING METHOD

(71) Applicant: Toyo Tire Corporation, Itami (JP)

(72) Inventor: Taiyo Sasaki, Itami (JP)

(73) Assignee: TOYO TIRE CORPORATION, Itami (JP)

( * ) Notice: Subject to any disclaimer, the term of this patent is extended or adjusted under 35 U.S.C. 154(b) by 110 days.

(21) Appl. No.: 16/710,294

(22) Filed: Dec. 11, 2019

(65) Prior Publication Data
US 2020/0191234 A1    Jun. 18, 2020

(30) Foreign Application Priority Data
Dec. 14, 2018  (JP) .............................. JP2018-234827

(51) Int. Cl.
| | |
|---|---|
| *F16F 13/10* | (2006.01) |
| *F16F 13/18* | (2006.01) |
| *F16F 13/26* | (2006.01) |
| *F16F 1/373* | (2006.01) |
| *B60K 5/12* | (2006.01) |

(52) U.S. Cl.
CPC ............ *F16F 13/105* (2013.01); *F16F 13/18* (2013.01); *B60K 5/1208* (2013.01); *F16F 1/3732* (2013.01); *F16F 13/268* (2013.01); *F16F 2226/04* (2013.01)

(58) Field of Classification Search
CPC .......... F16F 13/06; F16F 13/08; F16F 13/085; F16F 13/103; F16F 13/105; F16F 13/108; F16F 13/16; F16F 13/18; B60K 5/1208; G01M 17/04
See application file for complete search history.

(56) References Cited

U.S. PATENT DOCUMENTS 5,516,084 A * 5/1996 Rizzo .................... F16F 13/105
                                                  267/140.13

FOREIGN PATENT DOCUMENTS

| JP | 2003-329079 A | 11/2003 |
| JP | 2010242906 A | * 10/2010 |

* cited by examiner

*Primary Examiner* — Thomas J Williams
(74) *Attorney, Agent, or Firm* — Westerman, Hattori, Daniels & Adrian, LLP

(57) ABSTRACT

A placing table includes a measuring-unit that measures a vertical position of an orifice member placed on the placing table, a position-regulating-portion that engages with a part of the orifice member of a type corresponding to the table, and an orifice-member-determination-unit that determines a placed state and type of the orifice member based on a measurement result obtained by the measuring-unit. When the corresponding type of the orifice member is placed in a correct posture, the position-regulating-portion engages with the orifice member and seats the orifice member on the table over the entire circumference of the lower end portion thereof. When a different type of orifice member is placed or when the corresponding type of orifice member is placed in an incorrect posture, the position-regulating-portion does not engage with the orifice member and lifts at least a part of the orifice member from the table.

5 Claims, 11 Drawing Sheets

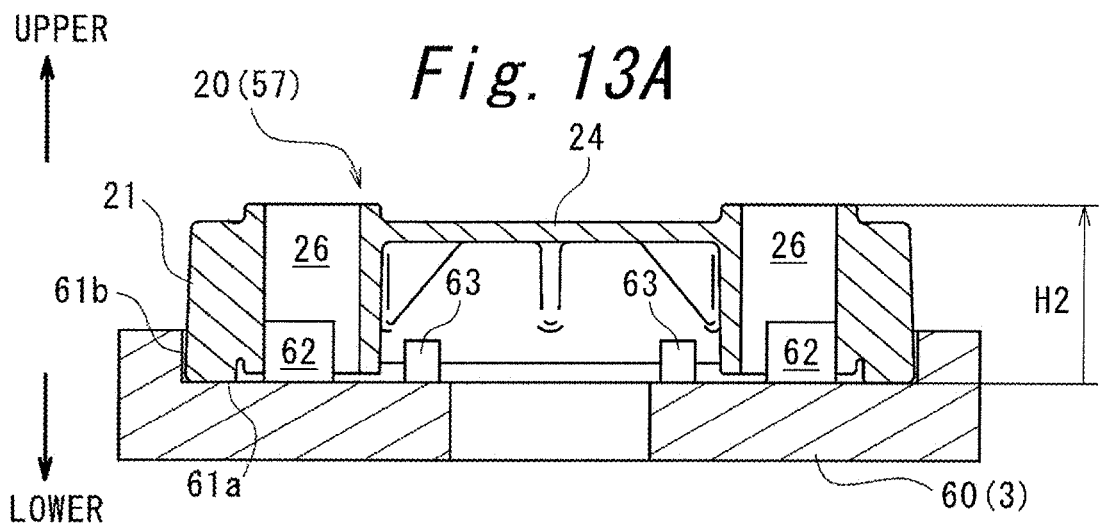
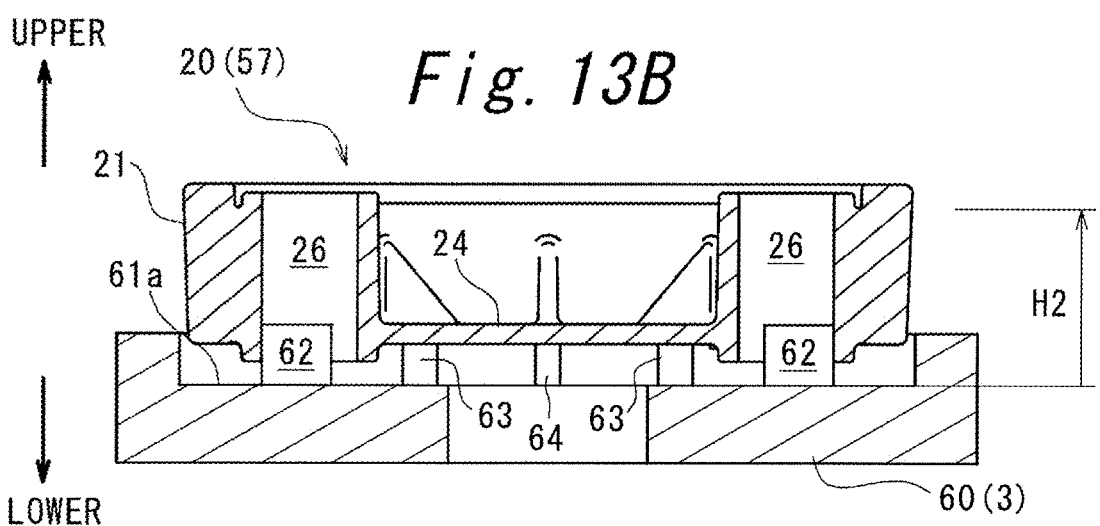
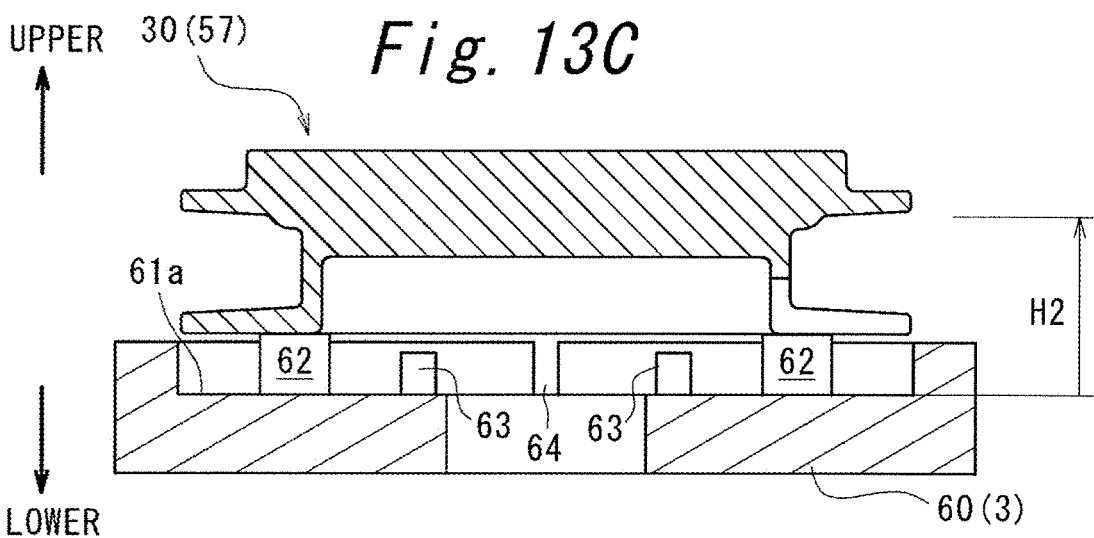

ORIFICE MEMBER PLACING TABLE, ORIFICE MEMBER PLACING METHOD, AND LIQUID-SEALED VIBRATION-PROOF MOUNT MANUFACTURING METHOD

CROSS-REFERENCE TO RELATED APPLICATIONS

This application claims priority of Japanese Patent Application No. 2018-234827 filed on Dec. 14, 2018, the content of which is incorporated herein by reference.

BACKGROUND OF THE INVENTION

Technical Field

The present invention relates to an orifice member placing table, an orifice member placing method, and a liquid-sealed vibration-proof mount manufacturing method.

Related Art

As disclosed in JP2003-329079, a liquid-sealed vibration-proof mount (hereinafter referred to as a liquid-sealed mount rubber) has a liquid such as water, ethylene glycol, or silicone oil sealed in a liquid chamber formed in a rubber member. An orifice member is incorporated in the liquid chamber. The liquid chamber is partitioned into two liquid chambers on both sides of the orifice member. The two liquid chambers partitioned on both sides of the orifice member communicate with each other via a flow passage (orifice) formed in the orifice member.

After the orifice member is placed on the placing table by the worker, the orifice member is sucked and transferred by an orifice member transfer device and is incorporated in the liquid chamber of the rubber member. The placing table has a positioning portion for positioning the orifice member in preparation for suction by the orifice member transfer device. The positioning portion is configured as a recess into which the orifice member is fitted, and the orifice member is positioned and placed on the outer peripheral portion by the recess.

Due to a mistake in placing the orifice member by the worker, the orifice member may not be completely fitted into the recess, and the orifice member may be placed in an incorrect posture (for example, inclined). In this case, a problem occurs in the suction of the orifice member by the orifice member transfer device.

In general, an orifice member has a top and a bottom in the thickness direction. If the orifice member is placed in the wrong direction (upside-down) on the placing table, the orifice member in the wrong direction may be incorporated in the liquid-sealed vibration-proof mount.

In addition, there are various types of orifice members having different specifications depending on the required vibration-proof performance and the like. As a result, if the worker mistakenly places an orifice member different in type from an orifice member to be incorporated in a liquid-sealed mount rubber to be manufactured, on the placing table, the orifice member transfer device may suck and incorporate the different type of orifice member in the liquid-sealed mount rubber. That is, there is a risk of wrong incorporation.

SUMMARY

It is an object of the present invention to provide an orifice member placing table, an orifice member placing method, and a liquid-sealed vibration-proof mount manufacturing method, which enable determination of the placed state and type of an orifice member placed on the placing table.

The present invention provides an orifice member placing table on which an orifice member to be incorporated in a liquid chamber of a liquid-sealed vibration-proof mount is placed. The placing table includes a measuring unit that measures a vertical position of the orifice member placed on the placing table, a position regulating portion that engages with a part of the orifice member of a type corresponding to the placing table, and an orifice member determination unit that determines a placed state of the orifice member and a type of the orifice member based on a measurement result obtained by the measuring unit. When the corresponding type of the orifice member is placed in a correct posture, the position regulating portion engages with the orifice member and seats the orifice member on the placing table over an entire circumference of a lower end portion of the orifice member. When a different type of orifice member different, at least, in shape from the corresponding orifice member is placed or when the corresponding type of orifice member is placed in an incorrect posture, the position regulating portion does not engage with the orifice member and lifts at least a part of the orifice member from the placing table.

According to the present invention, except when the corresponding type of orifice member is mounted in a correct posture, an orifice member is not seated on the placing table and at least a part of the orifice member is lifted from the placing table. That is, based on the vertical position of the orifice member measured by the measuring unit, the placed state of the orifice member placed on the placing table and the type of the orifice member can be determined.

Accordingly, when an orifice member of a type corresponding to the placing table is placed in an incorrect posture or when an orifice member of a type not corresponding to the placing table is placed, it can be determined that at least one of the placed state and type of the orifice member is not appropriate for a liquid-sealed mount rubber to be manufactured. This makes it possible to prevent, for example, a suction error caused by a suction portion or wrong incorporation of a wrong type of orifice member.

Therefore, it is possible to prevent a suction error of a placed orifice member and wrong incorporation of a different type of orifice member.

Preferably, the corresponding orifice member includes a through-hole extending through the orifice member in a thickness direction and a partition wall that partitions the orifice member in the thickness direction at a position displaced to an opposite side to the placing table relative to a central portion in the thickness direction while the orifice member is placed on the placing table in a correct posture, and the position regulating portion includes a positioning pin that engages with the through-hole and a lifting pin that does not interfere with the partition wall when the corresponding orifice member is positioned by the positioning pin and placed in a correct posture, and interferes with the partition wall and lifts the orifice member from the placing table when the non-corresponding orifice is placed or the corresponding orifice member is placed in an incorrect posture.

According to this configuration, when an orifice member has a through-hole extending through the orifice member in the thickness direction and a partition wall displaced to one side in the thickness direction, the above effect of the present invention is preferably realized.

Preferably, the corresponding orifice member includes a notch formed in one end portion located on a first side in the thickness direction so as to be notched in a groove shape, with the first side opening to an inside of the orifice member in a direction orthogonal to the thickness direction, and the position regulating portion engages with the notch when the corresponding orifice member is placed in a correct posture, and interferes with a second end portion located on the second end side in the thickness direction of the orifice member and lifts the orifice member from the placing table when the non-corresponding orifice member is placed or the corresponding orifice member is placed in an incorrect posture.

According to this configuration, when an orifice member has a groove-shaped notch formed in one end portion located on one side in the thickness direction, the effect of the invention is preferably realized.

Another aspect of the present invention also provides an orifice member placing method including placing the corresponding orifice member on an orifice member placing table described in any one of the above aspects, detecting a vertical position of the orifice member on the placing table by using the measuring unit, and determining a placed state of the orifice member based on a measurement result obtained by the measuring unit.

Still another aspect of the present invention provides a liquid-sealed vibration-proof mount manufacturing method including preparing a rubber member in which a liquid chamber is formed and an orifice member to be incorporated in the liquid chamber, placing the orifice member on the placing table by the above orifice member placing method, and holding the placed orifice member and incorporating the orifice member in the liquid chamber of the rubber member.

According to the present invention, it is possible to determine the placed state and type of the orifice member placed on the placing table.

BRIEF DESCRIPTION OF THE DRAWINGS

The foregoing and the other features of the present invention will become apparent from the following description and drawings of an illustrative embodiment of the invention in which:

FIG. 13A is a view showing a state in which the first orifice member is placed in the correct posture on the first placing table;

FIG. 13B is a view showing a state in which the first orifice member is placed in an incorrect posture on the first placing table;

FIG. 13C is a view showing a state in which the second orifice member is placed on the first placing table;

DETAILED DESCRIPTION OF EMBODIMENTS

An embodiment according to the present invention will be described below with reference to the accompanying drawings. Note that the following description is substantially a mere example and is not intended to limit the present invention, applicable objects thereof, and use thereof. Furthermore, the drawings are schematic, and the ratio among dimensions is different from the actual ones.

Figure 1:
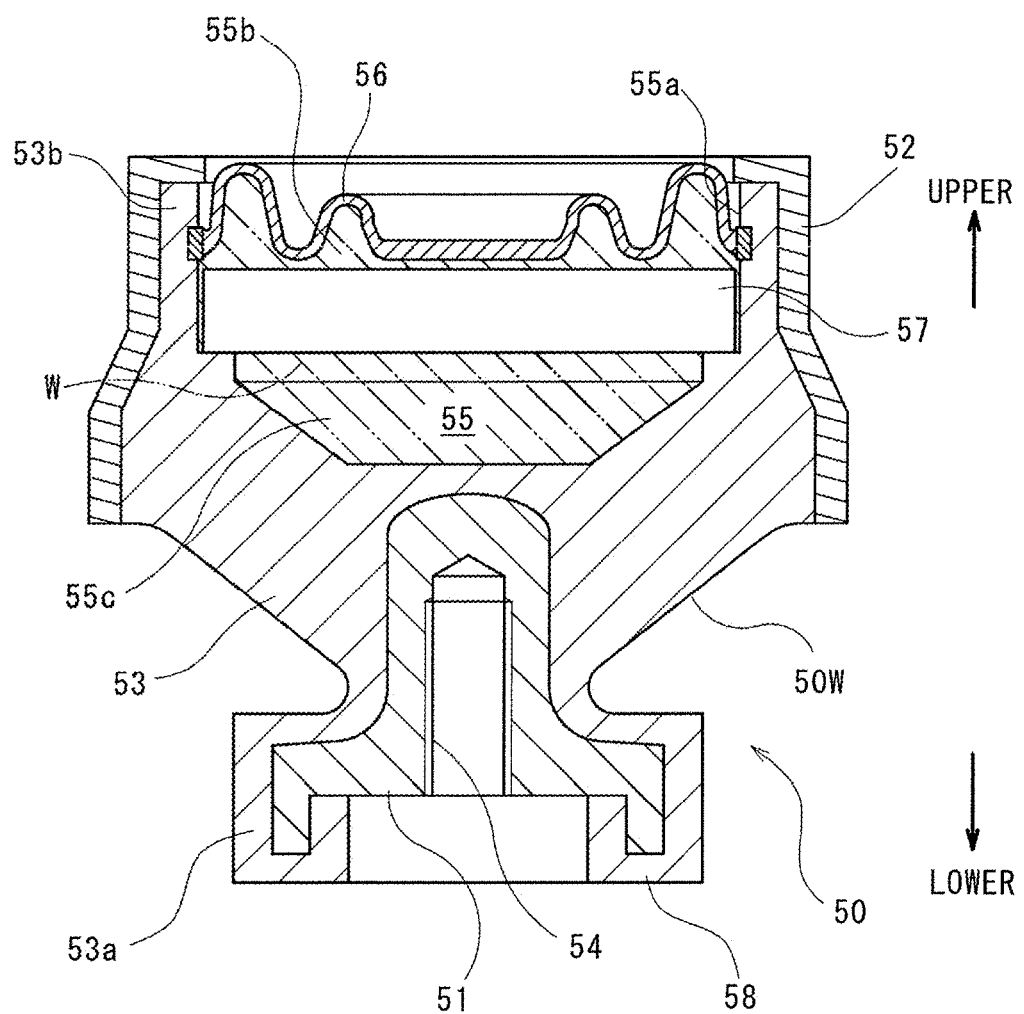
FIG. 1 is a sectional view of a liquid-sealed engine mount rubber.

FIG. 1 shows a liquid-sealed engine mount rubber 50 (hereinafter referred to as the liquid-sealed mount rubber 50) as an example of a vehicle vibration-proof rubber. The liquid-sealed mount rubber 50 is interposed between an engine and a vehicle body frame (that are not shown) to elastically support the engine with respect to the vehicle body frame. The liquid-sealed mount rubber 50 includes a boss fitting 51 attached to the engine, an outer tube fitting 52 attached to the vehicle body frame, and an elastic base body 53 formed from a rubber member interposed between the boss fitting 51 and the outer tube fitting 52.

In the following description, for convenience, in the axial direction of the liquid-sealed mount rubber 50 (the vertical direction in FIG. 1), the boss fitting 51 side is the lower side and the outer tube fitting 52 side is the upper side.

The boss fitting 51 is provided with a female threaded portion 54 extending in the vertical direction, and is configured to be attached to a member on the engine side with a bolt (not shown). The outer tube fitting 52 is a metal cylindrical member, is exposed on the outer surface of the liquid-sealed mount rubber 50, and is attached to the vehicle body frame.

The boss fitting 51 is vulcanized and bonded to a lower end portion 53a of the elastic base body 53, and the outer tube fitting 52 is fixed to an upper end portion 53b of the elastic base body 53 by caulking. The upper end portion 53b has an outer diameter larger than that of the lower end portion 53a, and a liquid chamber 55 that opens upward is defined inside the upper end portion 53b. A diaphragm 56 is provided in an opening 55a at the upper end of the liquid chamber 55.

The liquid chamber 55 is hermetically sealed by the diaphragm 56. A liquid W such as water, ethylene glycol, or silicone oil is sealed in the liquid chamber 55. An orifice member 57 is incorporated in the liquid chamber 55. The liquid chamber 55 is vertically partitioned into an upper first chamber 55b and a lower second chamber 55c by the orifice member 57. The first chamber 55b and the second chamber 55c communicate with each other through an orifice flow passage (not shown) formed in the orifice member 57. Thus, the liquid sealed in the liquid chamber 55 is configured to be able to flow between the first chamber 55b and the second chamber 55c.

Figure 2:
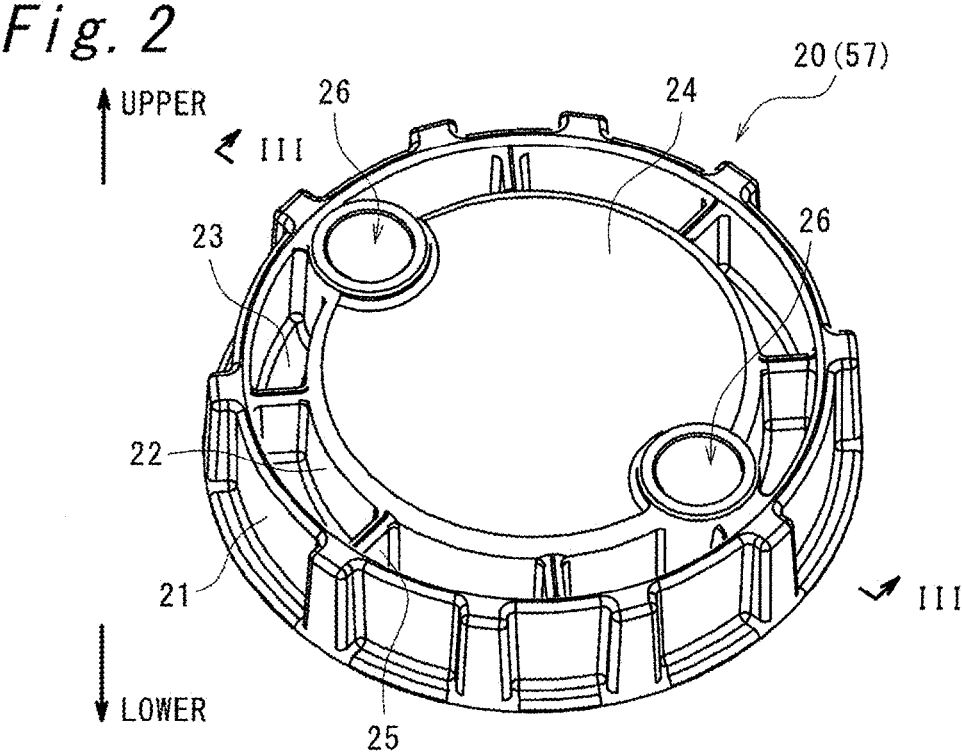
FIG. 2 is a perspective view of a first orifice member.

FIG. 2 shows a first type of orifice member 20 (hereinafter referred to as the first orifice member) as an example of the orifice member 57. FIG. 2 is a perspective view of the first orifice member 20 as viewed from above. As shown in FIG. 2, the first orifice member 20 includes a cylindrical outer tube 21 extending in the vertical direction, a cylindrical inner tube 22 concentrically located inside the outer tube 21 and extending in the vertical direction, a lower partition wall 23 that connects the outer tube 21 to the lower end portion of the inner tube 22, and an upper partition wall 24 (partition wall) that partitions the upper end portion of the inner tube 22 in the vertical direction. Ribs 25 that connect the outer tube 21 and the inner tube 22 in the radial direction are provided between the outer tube 21 and the inner tube 22 at a plurality of locations in the circumferential direction.

A pair of through-holes 26 are provided inside the outer tube 21 in the radial direction so as to extend through the lower partition wall 23, the inner tube 22, and the upper partition wall 24 in the vertical direction (the thickness direction of the first orifice member 20). The through-holes 26 are configured as orifice flow passages that communicate between the first chamber 55b and the second chamber 55c in the liquid chamber 55.

Figure 3:
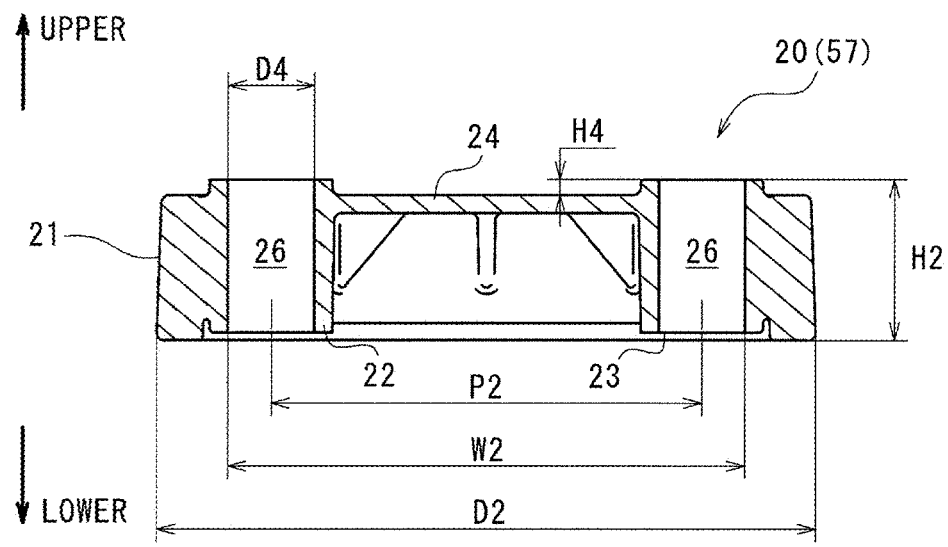
FIG. 3 is a sectional view taken along line III-III in FIG. 2.

FIG. 3 is a longitudinal sectional view taken along line III-III in FIG. 2, which passes through the axes of the pair of through-holes 26. As shown in FIG. 3, the upper partition wall 24 is provided at a position displaced above the central portion in the vertical direction.

Figure 4:
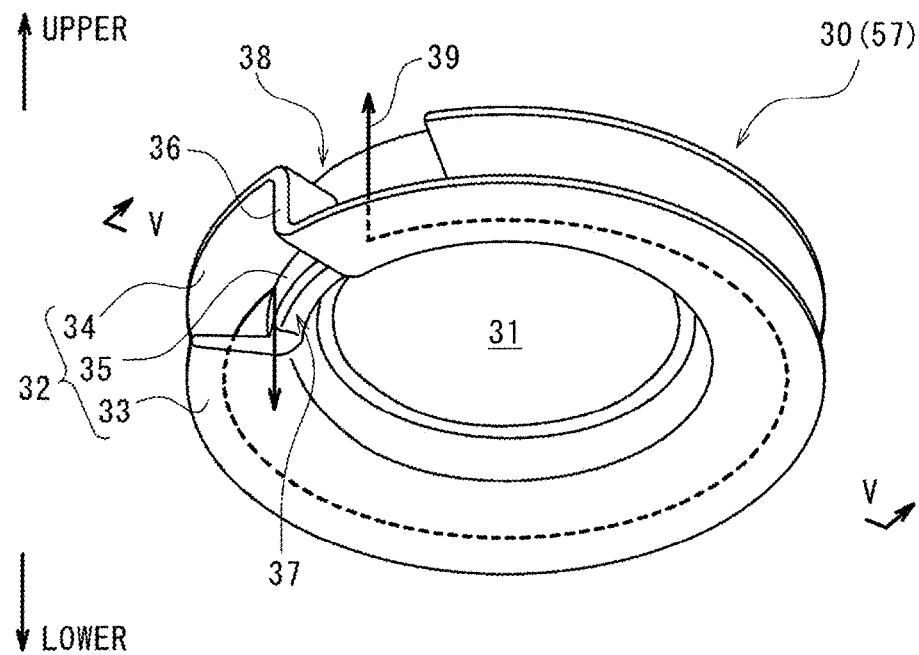
FIG. 4 is a perspective view of a second orifice member.

FIG. 4 shows a second type of orifice member 30 (hereinafter referred to as the second orifice member) as another example of the orifice member 57. FIG. 4 is a perspective view of the second orifice member 30 as viewed from below. As shown in FIG. 4, the second orifice member 30 includes a columnar portion 31 extending in the vertical direction and a U-shaped sectional portion 32 extending along the outer peripheral portion of the columnar portion 31 by one turn and opening radially outward.

The U-shaped sectional portion 32 includes a donut-shaped lower partition wall 33 constituting the lower end portion, a donut-shaped upper partition wall 34 constituting the upper end portion, an upper-lower wall 35 that connects the radially inner diameter portions of the lower partition wall 33 and the upper partition wall 34 in the vertical direction, and an upper-lower partition wall 36 that extends in the radial direction and connects the lower partition wall 33 and the upper partition wall 34 in the vertical direction. In the vertical direction, the columnar portion has a lower end portion located between the lower partition wall 33 and the upper partition wall 34, and an upper end portion located above the upper partition wall 34.

Figure 5:
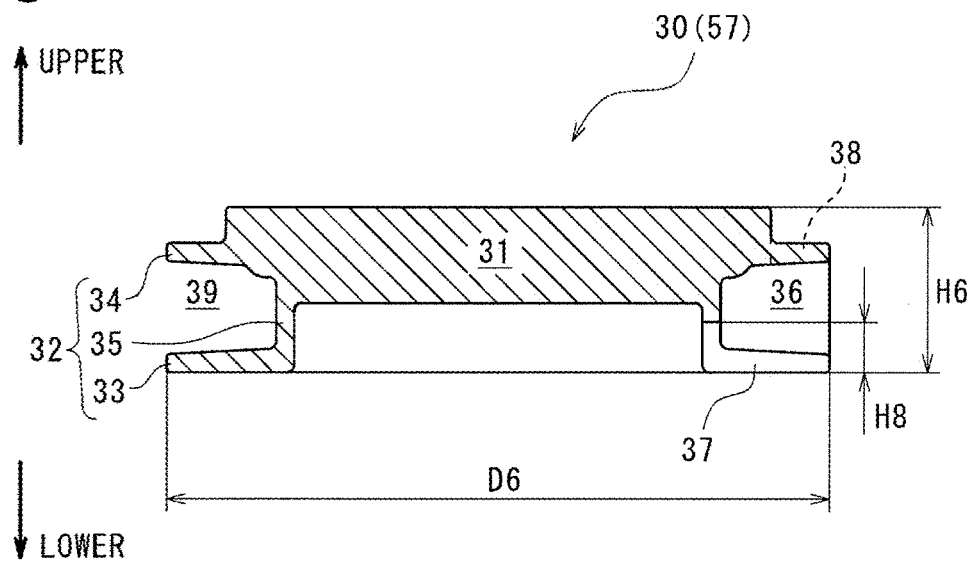
FIG. 5 is a sectional view taken along line V-V in FIG. 4.

FIG. 5 shows a longitudinal sectional view taken along line V-V in FIG. 4. Referring also to FIG. 5, the U-shaped sectional portion 32 has a lower notch 37 is formed by notching through radially inwardly from the lower partition wall 33 to the upper-lower wall 35 on the lower side of the columnar portion 31 (one end portion side of the second orifice member 30). The lower notch 37 is adjacent to one side in the circumferential direction with respect to the upper-lower partition wall 36. The lower notch 37 extends through a lower side portion of the U-shaped sectional portion 32 in a groove shape in the radial direction so as to open downward.

On the upper partition wall 34 (on the other end portion side of the second orifice member 30), an upper notch 38 notched radially inward is formed. The upper notch 38 is located on the opposite side of the upper-lower partition wall 36 to the lower notch 37 in the circumferential direction. The upper-lower wall 35 is not notched in a portion of the U-shaped sectional portion 32 in which the upper notch 38 is formed. That is, the upper notch 38 does not extend through the U-shaped sectional portion 32 radially inward, and an outer peripheral portion of the columnar portion 31 is located on the inner diameter side of the upper notch 38.

As shown by arrows in FIG. 4, the second orifice member 30 has a flow passage 39 extending from the lower notch 37 to the upper notch 38 via the U-shaped sectional portion 32 on the outer peripheral portion of the columnar portion 31. Accordingly, referring to FIG. 1, the flow passage 39 is configured as an orifice flow passage that communicates between the first chamber 55b and the second chamber 55c in the liquid chamber 55.

An assembly process for the liquid-sealed mount rubber 50 will be described with reference to FIG. 6. In mount workpiece placing step 41 shown in FIG. 6A, a mount workpiece 50W in which the boss fitting 51 is vulcanized to the elastic base body 53 is prepared, and the mount workpiece 50W is placed on the assembly table 47 in a posture in which the opening 55a of the liquid chamber 55 opens upward.

Figure 6A:
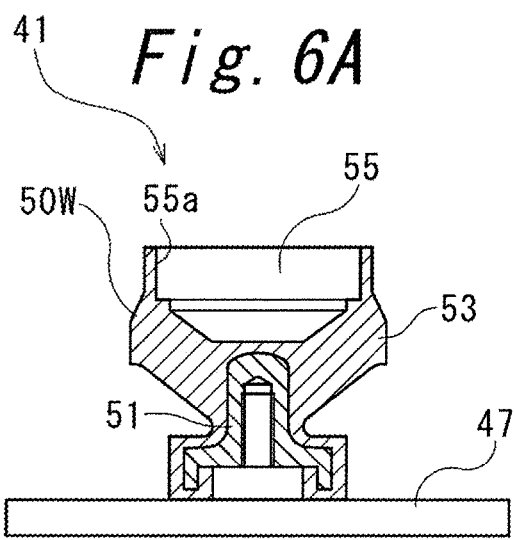
FIGS. 6A to 6F are explanatory views showing an assembly process for a liquid-sealed engine mount rubber.
Figure 6B:
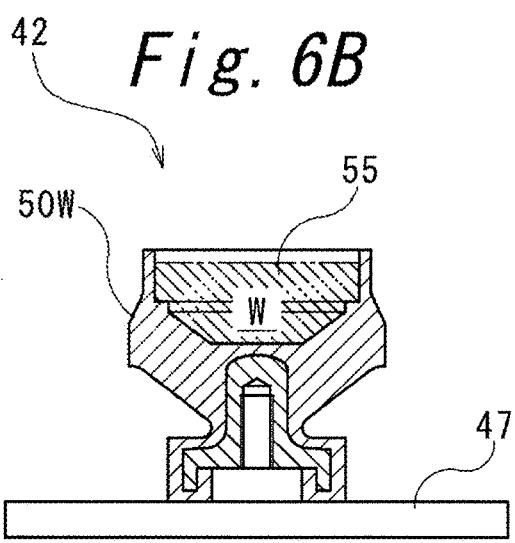
Figure 6C:
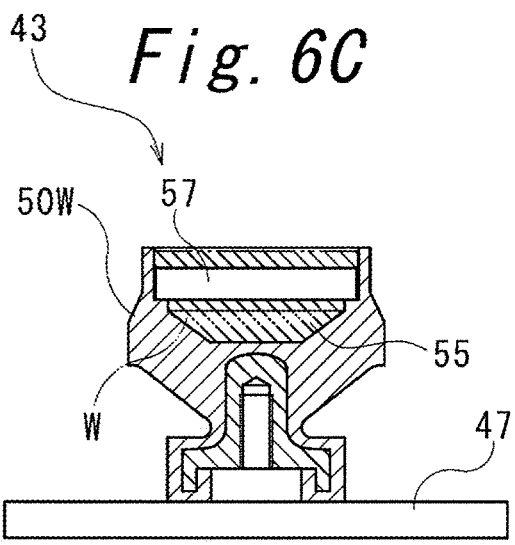
Figure 6D:
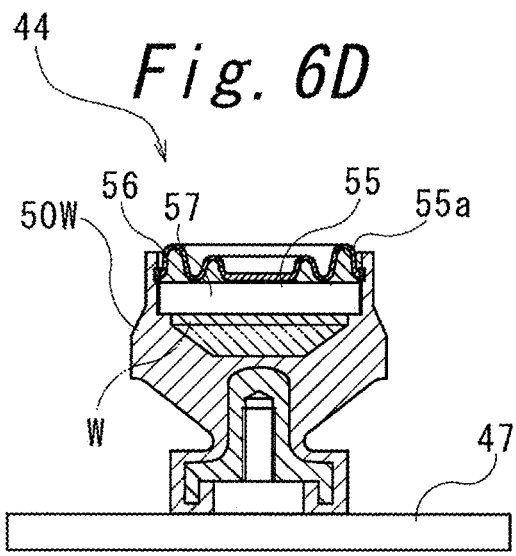

Next, in liquid put step 42 shown in FIG. 6B, a predetermined amount of liquid W is put into the liquid chamber 55. In orifice member mounting step 43 shown in FIG. 6C, the orifice member 57 is incorporated in the liquid chamber 55. Further, in diaphragm mounting step 44 shown in FIG. 6D, the diaphragm 56 is mounted in the opening 55a of the liquid chamber 55.

Figure 6E:
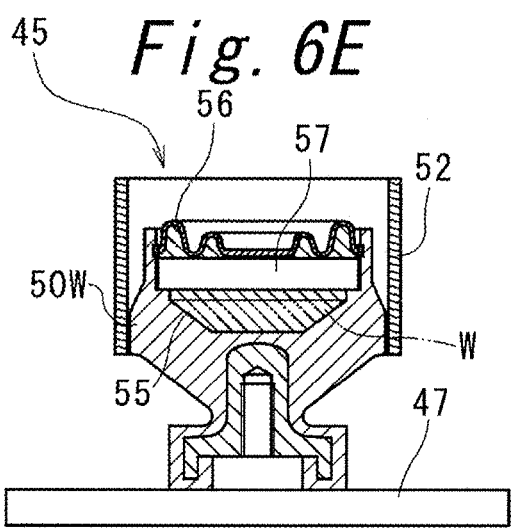
Figure 6F:
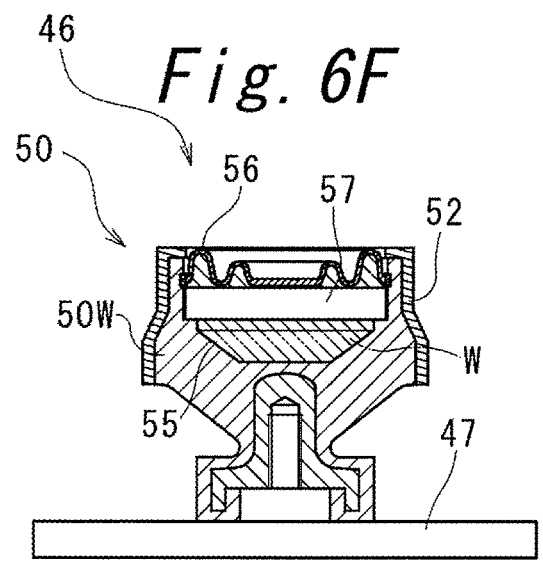

In outer-tube-fitting mounting step 45 shown in FIG. 6E, the outer tube fitting 52 is fitted on the outer circumference of the upper end portion of the mount workpiece 50W. Finally, in liquid-chamber sealing step 46 shown in FIG. 6F, the outer tube fitting 52 is caulked inward in the radial direction, and the diaphragm 56 is fixed to the opening 55a of the liquid chamber 55 to seal the liquid W in the liquid chamber 55. As a result, the liquid-sealed mount rubber 50 is manufactured.

The orifice member transfer device 1 that sucks the orifice member 57 and transfers it to orifice member mounting step 43 will be described below.

Figure 7:
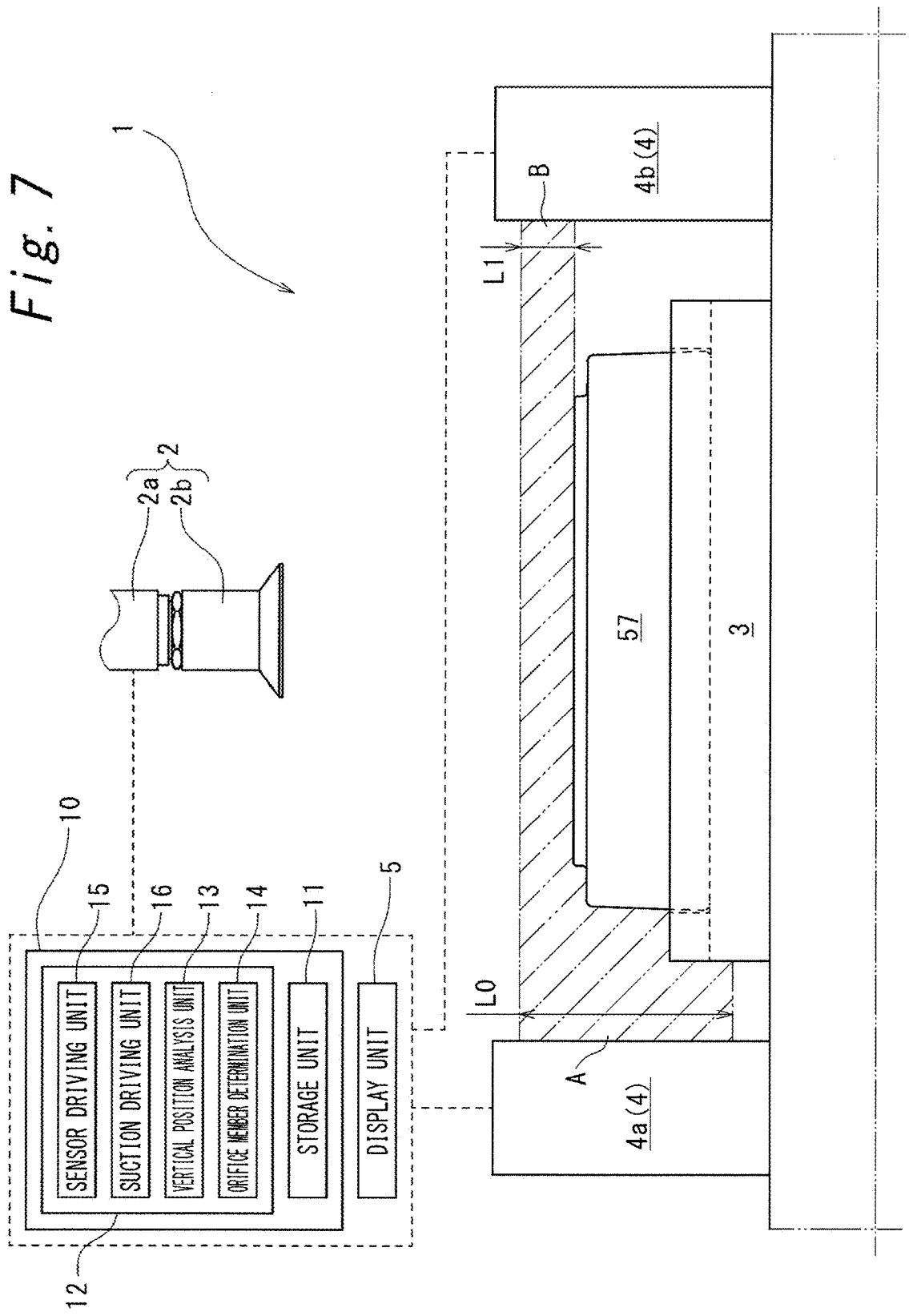
FIG. 7 is a view showing a schematic configuration of an orifice member transfer device.

FIG. 7 is a view showing a schematic configuration of the orifice member transfer device 1 and the orifice member 57. As shown in FIG. 7, an orifice member transfer device 1 includes a suction portion 2 that sucks (holds) the orifice member 57, a placing table 3 on which the orifice member 57 is placed, a measuring unit 4 that measures the orifice member 57 placed on the placing table 3, a display unit 5, and a control unit 10 that controls the operation of the orifice member transfer device 1.

The suction portion 2 has a suction rod 2a and a suction pad 2b attached to the lower end portion thereof. A negative pressure source (not shown) is connected to the proximal end portion of the suction rod 2a, and the inside of the suction pad 2b is configured in a negative pressure state. The suction pad 2b is a hollow rubber member, and is formed in a conical shape that expands in the radial direction downward. The suction pad 2b sucks an object to be sucked by a negative pressure, with the lower end portion being along the object to be sucked and the inside of the suction pad 2b being substantially sealed.

The suction portion 2 is configured to be movable upward and downward, leftward and rightward, and forward and backward by a moving means (not shown) (for example, a robot). The control unit 10 controls the operation of the suction portion 2. The suction portion 2 sucks, from above, a substantially flat portion of the upper partition wall 24 of the first orifice member 20 in which the through-hole 26 is not formed. Further, the suction portion 2 sucks, from above, a substantially flat portion of the upper end face of the columnar portion 31 of the second orifice member 30 in which no through-hole is formed.

The measuring unit 4 is a transmission laser sensor, and includes an irradiation unit 4a and a light receiving unit 4b provided in pair on both sides of the placing table 3. The measuring unit 4 uses the orifice member 57 placed on the placing table 3 as a measurement object. Irradiation light A having an irradiation width L0 in the vertical direction is applied to the measurement object by the irradiation unit 4a. Of the irradiation light, transmitted light B having a transmission width L1 blocked and reduced in the vertical direction by the measurement object is received by the light receiving unit 4b. The measuring unit 4 measures the transmission width L1 and the vertical position of the transmitted light B.

In the present embodiment, the light receiving unit 4b is configured to have a detection capability of less than 1 mm. More preferably, the light receiving unit 4b is configured to be able to detect the transmission width L1 and the vertical position of the transmitted light B in units of 0.1 mm.

The display unit 5 displays the measurement result obtained by the measuring unit 4 and the determination result obtained by the placed orifice member 57 which is determined by the control unit 10 to be described later.

The placing table 3 is exchangeably provided with a first placing table 60 and a second placing table 70 in accordance with the first orifice member 20 and the second orifice member 30. That is, in manufacturing the liquid-sealed mount rubber 50 in which the first orifice member 20 is incorporated, the first placing table 60 is disposed as the placing table 3 in the orifice member transfer device 1. Meanwhile, in manufacturing the liquid-sealed mount rubber 50 in which the second orifice member 30 is incorporated, the second placing table 70 is disposed as the placing table 3 in the orifice member transfer device 1.

Note that the orifice member transfer device 1 may be configured to be able to detect that the placing table 3 corresponding to the liquid-sealed mount rubber 50 to be manufactured is disposed. For example, the placing table 3 disposed in the orifice member transfer device 1 may be discriminated by providing an IC chip corresponding to each of the first and second placing tables 60 and 70 or by forming different shapes different from each other on the outer peripheral portions of the first and second placing tables 60 and 70 and reading the IC chip or detecting the different shape with a sensor.

On the first and second placing tables 60 and 70, the first and second orifice members 20 and 30 are placed in a posture in which they are incorporated in the liquid-sealed mount rubber 50 in the vertical direction. Accordingly, when the first orifice member 20 is placed in the correct posture by the worker, the first orifice member 20 is placed on the first placing table 60, with the lower partition wall 23 facing downward. Similarly, the second orifice member 30 is placed on the second placing table 70, with the lower partition wall 33 facing downward.

Figure 8:
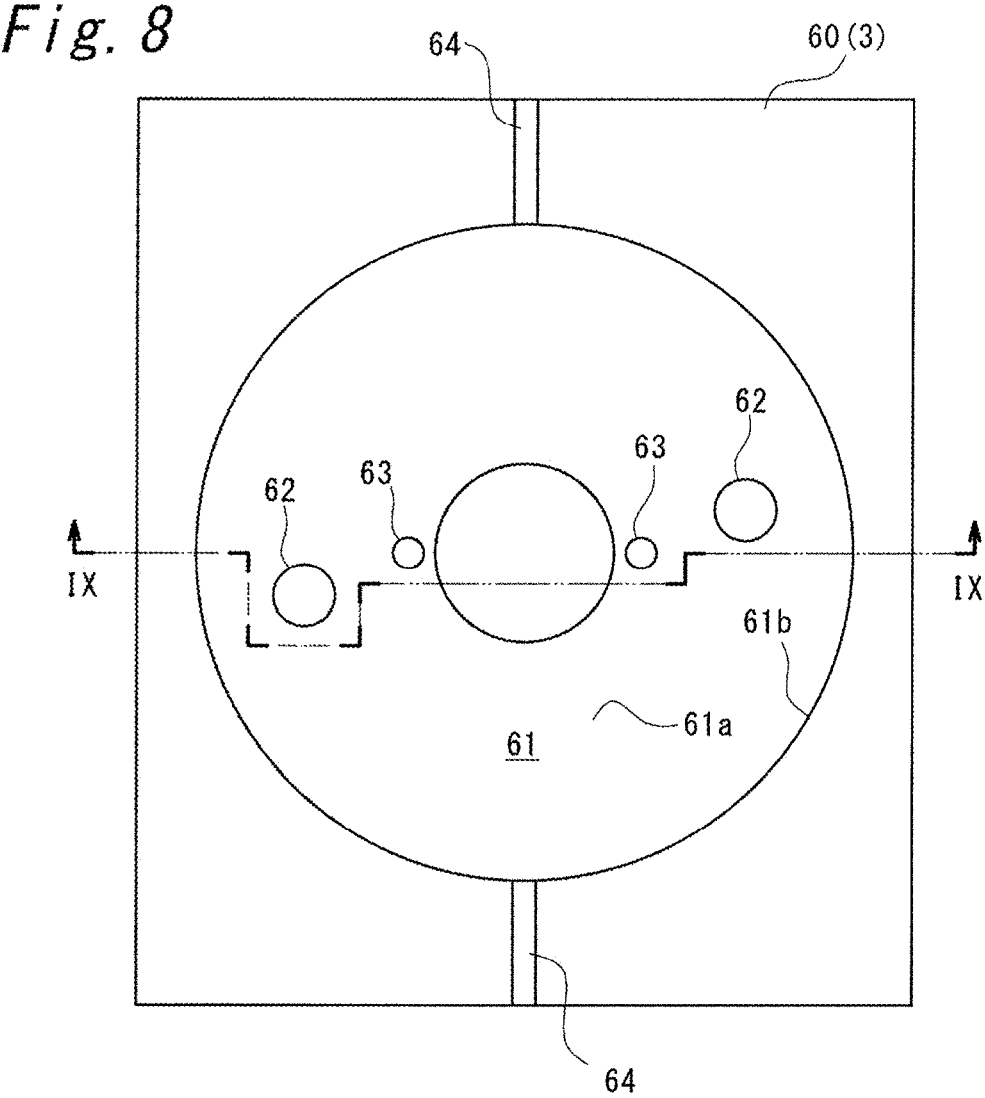
FIG. 8 is a view showing a first placing table.
Figure 9:
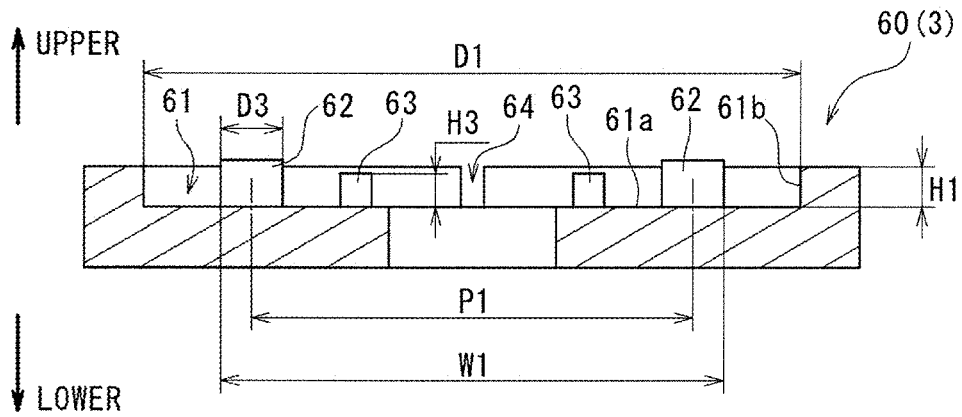
FIG. 9 is a sectional view taken along line IX-IX in FIG. 8.

FIG. 8 is a top view of the first placing table 60. FIG. 9 is a longitudinal sectional view of the first placing table 60. As shown in FIGS. 8 and 9, the first placing table 60 has a circular counterbore 61 recessed downward. The counterbore 61 has a bottom surface 61a and an outer peripheral surface portion 61b erected upward from the peripheral edge of the bottom surface 61a. On the bottom surface 61a, a pair of positioning pins 62 and a pair of lifting pins 63 are erected upward.

The counterbore 61 has a counterbore diameter D1 slightly larger (for example, 1 mm) than an outer diameter D2 (see FIG. 3) of the first orifice member 20 and a counterbore depth H1 lower than a height H2 of the first orifice member 20. That is, when the first orifice member 20 is placed in the counterbore 61, the outer tube 21 is regulated by the outer peripheral surface portion 61b of the counterbore 61 and positioned in the radial direction, and the upper portion protrudes upward from the first placing table 60.

A pair of groove portions 64 radially communicating from the outer peripheral surface portion 61b to the outside of the first placing table 60 are formed on both sides of the center of the counterbore 61 in the radial direction. The pair of groove portions 64 are formed such that the bottom surfaces of the groove portions are the same height as the bottom surface 61a of the counterbore 61. The pair of groove portions 64 are respectively formed at positions where the irradiation light A applied by the irradiation unit 4a of the measuring unit 4 and the transmitted light B received by the light receiving unit 4b pass. The radial center of the counterbore 61 is located on the line connecting the pair of groove portions 64.

The pair of positioning pins 62 are provided at positions corresponding to the pair of through-holes 26 of the first orifice member 20 positioned in the radial direction by the counterbore 61. An outer diameter D3 of the positioning pin 62 is set to be smaller than an inner diameter D4 (see FIG. 3) of the through-hole 26, and an outer width W1 between the pair of positioning pins 62 is set to be substantially the same as or slightly smaller than an outer width W2 (see FIG. 3) between the pair of through-holes 26. The outer width W1 is obtained by adding the outer diameter D3 of the positioning pin 62 to an interval P1 between the centers of the pair of positioning pins 62. As shown in FIG. 3, the outer width W2 is obtained by adding the inner diameter D4 of the through-hole 26 to an interval P2 between the centers of the pair of through-holes 26.

The pair of lifting pins 63 are provided at radial positions corresponding to the upper partition wall 24 of the first orifice member 20 positioned in the radial direction by the counterbore 61. A height H3 of the lifting pin 63 is lower than half of the height H2 (see FIG. 3) of the first orifice member 20 and higher than a height H4 (see FIG. 3) from the upper end portion of the first orifice member 20 to the upper partition wall 24. The lifting pin 63 is lower than the positioning pin 62.

The pair of positioning pins 62 and the pair of lifting pins 63 are not located on the line connecting the pair of groove portions 64. Therefore, the irradiation light A and the transmitted light B passing through the pair of groove portions 64 are not blocked by the pair of positioning pins 62 and the pair of lifting pins 63. The line connecting the pair of groove portions 64 is substantially orthogonal to the line connecting the pair of positioning pins 62 and the pair of lifting pins 63. The pair of positioning pins 62 and the pair of lifting pins 63 constitute a position regulating portion according to the present invention.

Figure 10:
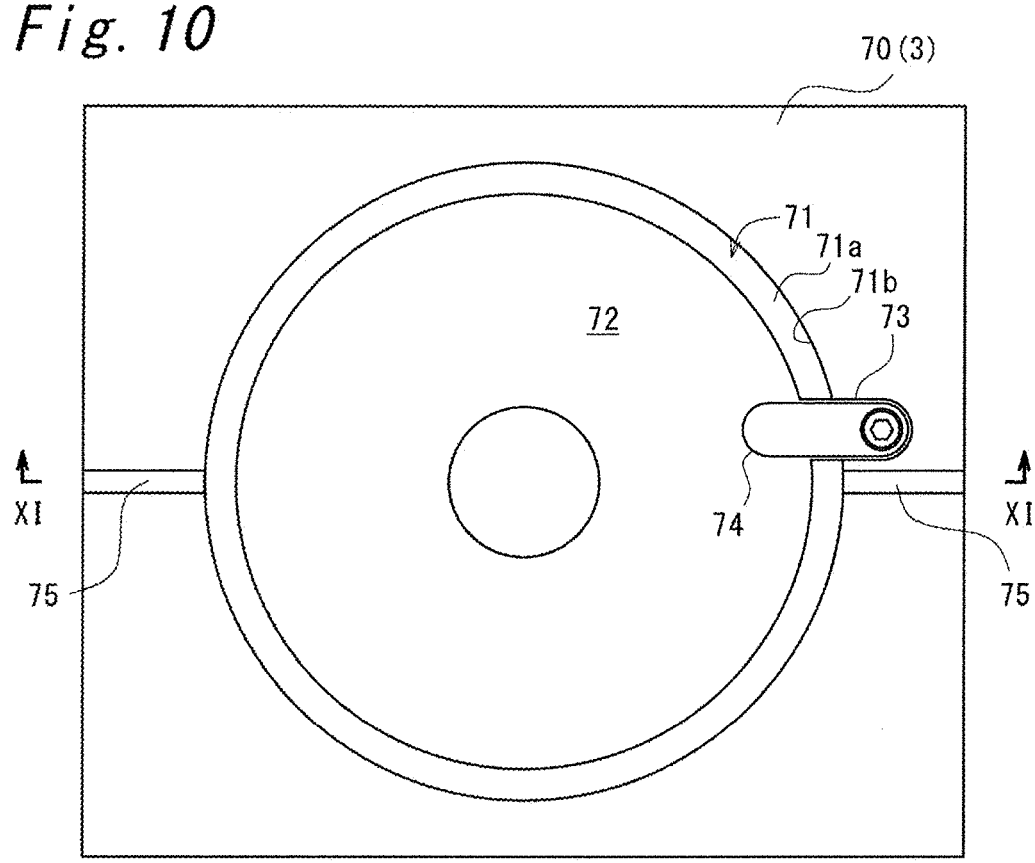
FIG. 10 is a view showing a second placing table.
Figure 11:
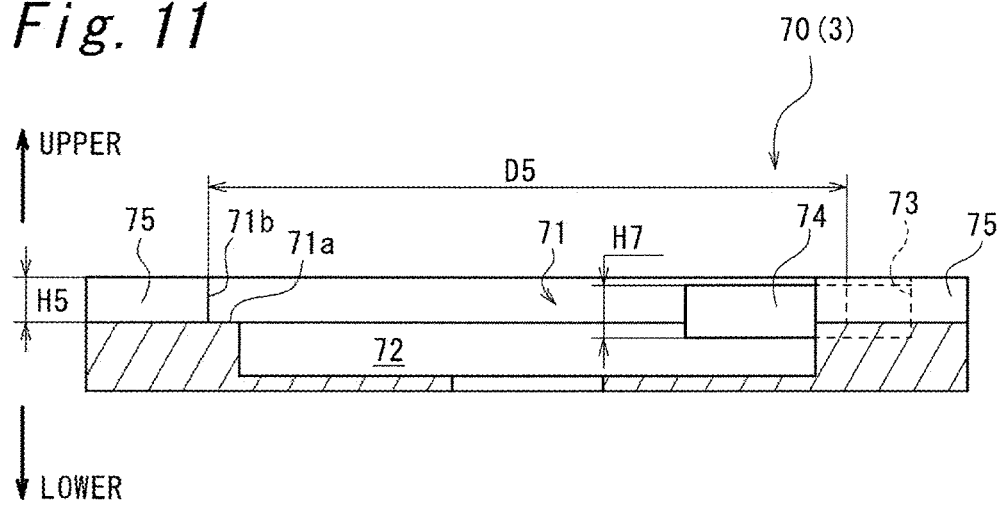
FIG. 11 is a sectional view taken along line XI-XI in FIG. 10.

FIG. 10 is a top view of the second placing table 70, and FIG. 11 is a longitudinal sectional view of the second placing table 70. As shown in FIG. 10 and FIG. 11, the second placing table 70 includes a circular first counterbore 71 recessed downward and a circular second counterbore 72 recessed radially inwardly therefrom and further downward. The first counterbore 71 has a donut-shaped bottom surface 71a and an outer peripheral surface portion 71b erected upward from the peripheral edge of the bottom surface 71a.

The first counterbore 71 has a counterbore diameter D5 slightly larger (for example, 1 mm) than an outer diameter D6 (see FIG. 5) of the second orifice member 30 and a counterbore depth H5 lower than a height H6 (see FIG. 5) of the second orifice member 30. That is, when the second orifice member 30 is placed in the first counterbore 71, the outer diameter portion of the U-shaped sectional portion 32 is regulated by the outer peripheral surface portion 71b of the first counterbore 71 and positioned in the radial direction, and the upper portion protrudes upward from the second placing table 70.

A pair of groove portions 75 radially communicating from the outer peripheral surface portion 71b to the outside of the second placing table 70 are formed on both sides of the center of the first counterbore 71 in the radial direction. The pair of groove portions 75 are formed such that the bottom surfaces of the groove portions are the same height as the bottom surface 71a of the first counterbore 71. The pair of groove portions 75 are respectively formed at positions where the irradiation light A applied by the irradiation unit 4a of the measuring unit 4 and the transmitted light B received by the light receiving unit 4b pass. The radial center of the first counterbore 71 is located on the line connecting the pair of groove portions 75.

A recess 73 is formed in the second placing table 70 near the groove portion 75 so as to be recessed downward from the outside of the first counterbore 71 to the upper end portion of the second counterbore 72. The recess 73 extends parallel to a line connecting the pair of groove portions 75. The recess 73 is provided with an engagement member 74 that extends inside the first and second counterbores 71 and 72. The engagement member 74 is provided at a position corresponding to the lower notch 37 of the second orifice member 30 positioned in the radial direction by the first counterbore 71.

In a top view, the engagement member 74 extends inward from the outer peripheral portion of the columnar portion 31 of the second orifice member 30 placed on the second placing table 70 in the correct posture. A protrusion height H7 of the engagement member 74 from the bottom surface 71a of the first counterbore 71 is lower than a height H8 (see FIG. 5) of the upper end face of the lower notch 37 of the second orifice member 30 from the lower surface of the lower partition wall 33. The engagement member 74 constitutes the position regulating portion according to the present invention.

As shown in FIG. 7, the control unit 10 is constituted by a known computer including a storage unit 11 such as a hard disk, an arithmetic processing unit (CPU) 12, a memory, and an input/output device and software installed in the computer.

The storage unit 11 stores the vertical reference positions of the first and second orifice members 20 and 30 on the corresponding first and second placing tables 60 and 70. The vertical reference positions indicate the vertical positions of the upper end portions of the first and second orifice members 20 and 30. In the present embodiment, the vertical reference positions indicate vertical positions with reference to the bottom surface 61a of the first placing table 60 and the bottom surface 71a of the second placing table 70 when the first and second orifice members 20 and 30 are respectively placed on the first and second placing tables 60 and 70.

The arithmetic processing unit 12 includes a vertical position analysis unit 13 that analyzes the vertical position of the first orifice member 20 or the second orifice member 30, which is the measurement object, based on the measurement result obtained by the measuring unit 4 and an orifice member determination unit 14 that determines the quality of the orifice member 57 placed on the placing table 3 based on the analysis result.

The orifice member determination unit 14 compares the measured vertical position of the orifice member 57 with the reference position stored in the storage unit 11 and determines the placed state of the orifice member 57 as "good" when the orifice member 57 of a type corresponding to the placing table 3 is placed in the correct posture and otherwise determines the placed state of the orifice member 57 as "not good".

More specifically, the orifice member determination unit 14 determines whether the difference between the measured vertical position of the orifice member 57 and the reference position is equal to or less than a predetermined threshold. If the difference from the reference position is equal to or less than the predetermined threshold, the orifice member determination unit 14 determines that the corresponding orifice member 57 is placed in the correct posture. In contrast, if the difference from the reference position is larger than the predetermined threshold, the orifice member determination unit 14 determines that the corresponding orifice member 57 is not placed or the corresponding orifice member 57 is placed in an incorrect posture.

In this case, the predetermined threshold is a value set in consideration of manufacturing variations in the vertical direction of the orifice member 57, and is set to, for example, ±0.75 mm.

The arithmetic processing unit 12 further includes a sensor driving unit 15 that controls the operation of the measuring unit 4 and a suction driving unit 16 that controls the operation of the suction portion 2. When the orifice member 57 is placed on the placing table 3, the sensor driving unit 15 drives the measuring unit 4 to apply the irradiation light A from the irradiation unit 4a, and causes the light receiving unit 4b to receive the transmitted light B, of the irradiation light A, which is partially blocked by the measurement object.

The suction driving unit 16 drives the suction portion 2 to suck the orifice member 57, transfer the orifice member 57 to the mount workpiece 50W, and incorporate the orifice member 57 in the liquid chamber 55 when the orifice member determination unit 14 determines that the placed state of the orifice member 57 is "good". In contrast, if the orifice member determination unit 14 determines that the placed state of the orifice member 57 is "not good", the suction driving unit 16 does not drive the suction portion 2, and the display unit 5 displays error indication. In addition, the operation of the orifice member transfer device 1 stops.

Figure 12:
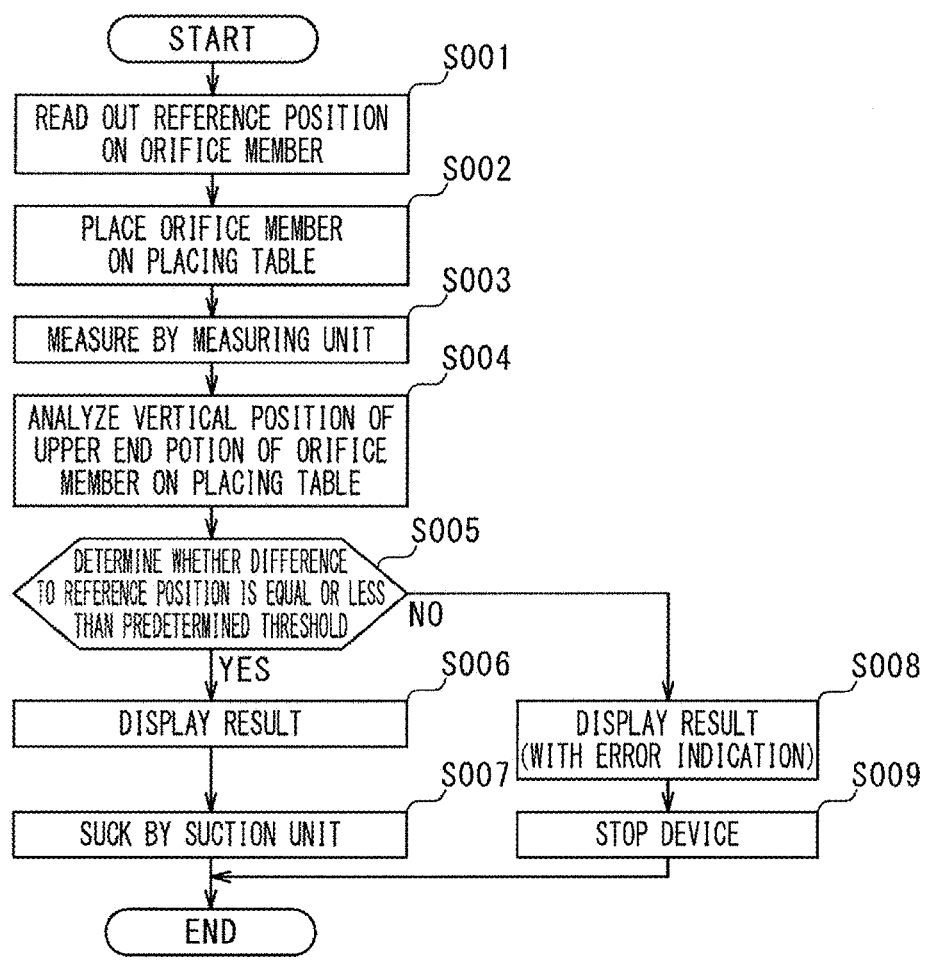
FIG. 12 is a flowchart showing the operation of the orifice member transfer device.

The operation of the orifice member transfer device 1 will be described next with reference to the flowchart shown in FIG. 12.

First of all, information as to the type of liquid-sealed mount rubber 50 to be manufactured is input from an input device (not shown), and the control unit 10 reads out the reference position of the type of orifice member 57 to be incorporated in the liquid-sealed mount rubber 50 from the storage unit 11 based on the input (step S001).

The worker then places the orifice member 57 on the placing table 3 (step S002). The control unit 10 causes the sensor driving unit 15 to drive the measuring unit 4 to measure the orifice member 57 placed on the placing table 3 (step S003).

The control unit 10 then causes the vertical position analysis unit 13 to analyze the vertical position of the upper end portion of the orifice member 57 placed on the placing table 3 (step S004). Next, the control unit 10 causes the orifice member determination unit 14 to determine whether the placed state of the orifice member 57 is good or not good, based on the analyzed vertical position of the upper end portion of the orifice member 57. More specifically, the orifice member determination unit 14 determines whether the difference between the analyzed vertical position of the upper end portion of the orifice member 57 and the reference position is equal to or less than a predetermined threshold (step S005).

For example, the following will exemplify the case in which the first orifice member 20 is of a type to be incorporated in the liquid-sealed mount rubber 50. As shown in FIG. 13A, when the first orifice member 20 is placed on the first placing table 60 in the correct posture, the outer tube 21 is positioned in the radial direction by the outer peripheral surface portion 61b of the counterbore 61 at the outer peripheral portion. In this state, the pair of positioning pins 62 are inserted inside the pair of through-holes 26, and the pair of lifting pins 63 face the upper partition wall 24 from below with a gap therebetween.

That is, the first orifice member 20 is seated on the bottom surface 61a of the counterbore 61 over the circumferential direction at the lowermost surface of the bottom portion of the outer tube 21 and supported from below. In this case, the first orifice member 20 protrudes upward from the first placing table 60 at the height H2 from the bottom surface 61a.

On the other hand, as shown in FIG. 13B, when the first orifice member 20 is placed on the first placing table upside down relative to the correct posture, the pair of positioning pins 62 are inserted into the pair of through-holes 26. However, the pair of lifting pins 63 interfere with the upper partition wall 24. As a result, the first orifice member 20 is lifted upward with respect to the bottom surface 61a of the counterbore 61 by the pair of lifting pins 63, and hence is not seated on the bottom surface 61a over the entire circumference.

For this reason, the first orifice member 20 protrudes upward as compared when the first orifice member 20 is placed on the first placing table 60 in the correct posture (FIG. 13A).

As shown in FIG. 13C, when the second orifice member 30 is placed on the first placing table 60, because the second orifice member 30 has no through-hole, the bottom portion interferes with the pair of positioning pins 62. As a result, the second orifice member 30 is lifted upward with respect to the bottom surface 61a of the counterbore 61 by the pair of positioning pins 62, and hence is not seated on the bottom surface 61a over the entire circumference.

The line connecting the pair of groove portions 64 is substantially orthogonal to the line connecting the pair of positioning pins 62 and the pair of lifting pins 63, and hence the first orifice member 20 and the second orifice member 30 lifted by the lifting pins 63 tend to be inclined in the direction connecting the pair of groove portions 64. Accordingly, the increased heights of the lifted first and second orifice members 20 and 30 can be easily measured by the measuring unit 4 that measures via the pair of groove portions 64.

Figure 14A:
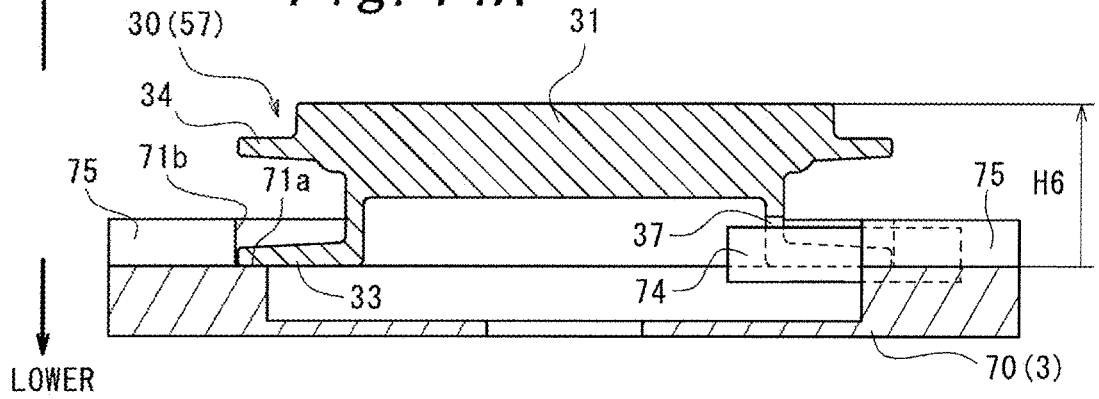
FIG. 14A is a view showing a state in which the second orifice member is placed in the correct posture on the second placing table.

The following will exemplify the case in which the second orifice member 30 is of a type to be incorporated in the liquid-sealed mount rubber 50. As shown in FIG. 14A, when the second orifice member 30 is placed on the second placing table 70 in the correct posture, the second orifice member 30 is positioned in the radial direction by the outer peripheral surface portion 71b of the first counterbore 71 at the outer diameter portion of the U-shaped sectional portion 32. In this state, the engagement member 74 is located inside the lower notch 37.

That is, the lower partition wall 33 of the second orifice member 30 is seated on the bottom surface 71a of the first counterbore 71 over the circumferential direction and supported from below. In this case, the second orifice member 30 protrudes upward from the second placing table 70 at the height H6 from the bottom surface 71a.

Figure 14B:
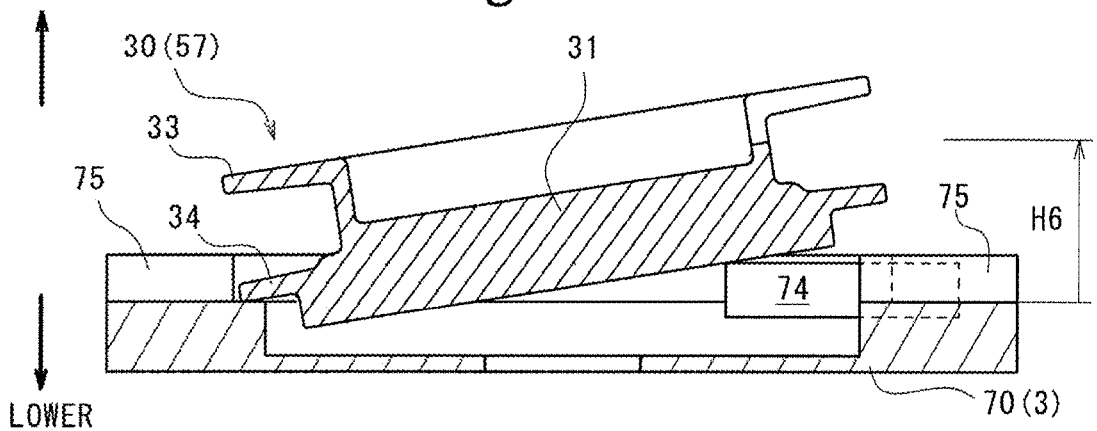
FIG. 14B is a view showing a state in which the second orifice member is placed in an incorrect posture on the second placing table.

On the other hand, as shown in FIG. 14B, when the second orifice member 30 is placed on the second placing table 70 in an upside-down posture with respect to the correct posture, the upper partition wall 34 rides on the engagement member 74. In this case, because the engagement member 74 extends inward more than the columnar portion 31, the engagement member 74 cannot be accommodated in the upper notch 38. As a result, the second orifice member 30 is inclined with respect to the bottom surface 71a of the first counterbore 71, with the engagement member 74 serving as a starting point, and hence is not seated on the bottom surface 71a over the entire circumference of the upper partition wall 34.

For this reason, the second orifice member 30 protrudes upward as compared when the second orifice member 30 is placed on the second placing table 70 in the correct posture (FIG. 14A).

Figure 14C:
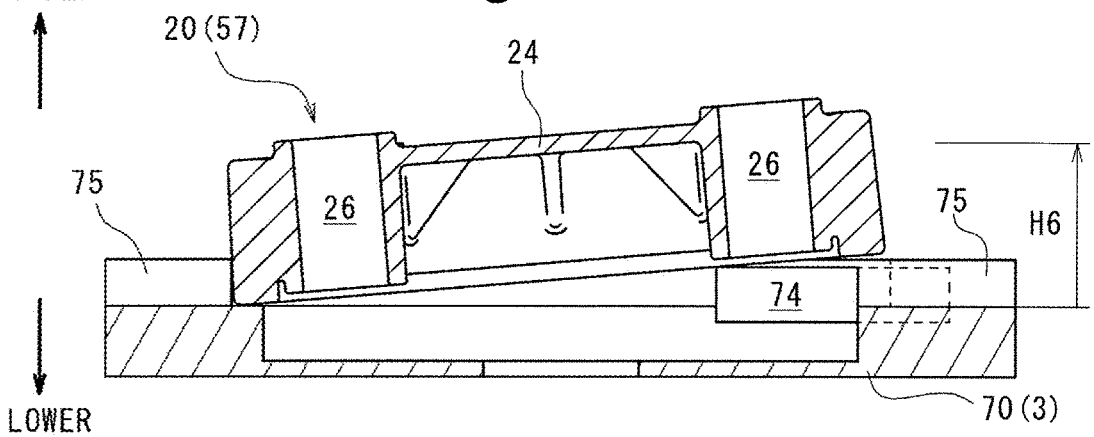
FIG. 14C is a view showing a state in which the first orifice member is placed on the second placing table.

As shown in FIG. 14C, when the first orifice member 20 is placed on the second placing table 70, because the first orifice member 20 does not have the lower notch 37, the bottom portion rides on the engagement member 74. As a result, the first orifice member 20 is inclined with respect to the bottom surface 71a of the first counterbore 71, with the engagement member 74 serving as a starting point, and hence the lower partition wall 23 is not seated on the bottom surface 71a over the entire circumference of the bottom surface 71a.

Because the engagement member 74 is provided adjacent to the groove portion 75, the first orifice member 20 and the second orifice member 30 placed upside down can be easily inclined in the direction connecting the pair of groove portions 75. Accordingly, the increased heights of the lifted and inclined first and second orifice members 20 and 30 can be easily measured by the measuring unit 4 that measures via the pair of groove portions 75.

Therefore, the vertical position of the orifice member 57 placed on the placing table 3 is lowest only when the type of orifice member 57 to be incorporated in the liquid-sealed mount rubber 50 to be manufactured is placed on the placing table 3 in the correct posture. In other cases, i.e., when a non-corresponding type of orifice member 57 is placed or when a corresponding type of orifice member 57 is placed upside down, the orifice member 57 is not seated on the placing table 3 over the entire circumference at the lower end portion. In this case, the vertical position of the orifice member 57 is higher than when the corresponding orifice member 57 is placed in the correct posture.

Accordingly, comparing the difference between the reference height and the measured vertical position with a predetermined threshold makes it possible to determine accurately and simply that the orifice member 57 is of a type to be incorporated in the liquid-sealed mount rubber 50 to be manufactured and is placed in the correct posture (the placed state), when the difference is equal to or less than the predetermined threshold. In contrast, when the difference exceeds the threshold, it is possible to accurately and easily determine that there is a problem in the placed state of the orifice member 57 or the orifice member 57 different from the type to be incorporated in the liquid-sealed mount rubber 50 to be manufactured is placed.

If YES in step S005, the control unit 10 causes the display unit 5 to display that the orifice member 57 is "good", that is, the type of orifice member 57 to be incorporated in the liquid-sealed mount rubber 50 to be manufactured is placed in the correct posture (step S006). Further, the control unit 10 causes the suction driving unit 16 to drive the suction portion 2 to suck the orifice member and incorporate the orifice member 57 in the liquid chamber 55 of the mount workpiece 50W (step S007).

In contrast, if NO in step S005, the control unit 10 causes the display unit 5 to display that the orifice member 57 is "not good", that is, the orifice member 57 different from the type that should be incorporated in the liquid-sealed mount rubber 50 to be manufactured is placed or the type of orifice member 57 to be incorporated in the liquid-sealed mount rubber 50 to be manufactured is placed in an incorrect posture, thereby notifying the worker of a placement error (step S008). Next, the control unit 10 stops the operation of the orifice member transfer device 1 (step S009).

According to the orifice member transfer device 1 described above, the following effects can be obtained.

Except when the type of orifice member 57 that should be incorporated in the liquid-sealed mount rubber 50 to be manufactured is mounted in the correct posture, the orifice member 57 is not seated on the placing table 3 over the entire circumference of the orifice member 57 and at least a part of the orifice member 57 is lifted from the placing table 3. That is, based on the vertical position of the orifice member 57 measured by the measuring unit 4, it is possible to determine the placed state of the orifice member 57 placed on the placing table 3 and whether or not the orifice member 57 placed on the placing table 3 is the type of orifice member 57 that should be incorporated.

Accordingly, when the orifice member 57 corresponding to the placing table 3 (that is, the orifice member 57 of a type that should be incorporated) is placed in an incorrect posture (for example, inclined) or when the orifice member 57 not corresponding to the placing table 3 (that is, the orifice member 57 of a type different from the type that should be incorporated) is placed, it can be determined that at least one of the placed state and type of orifice member 57 is not appropriate for the liquid-sealed mount rubber 50 to be manufactured. This makes it possible to prevent a suction error caused by a suction portion or wrong incorporation of a wrong type of orifice member 57.

This prevents a suction error with respect to the placed orifice member 57 and wrong incorporation of the orifice member 57 of a type different from the type to be incorporated.

In the above embodiment, the first and second orifice members 20 and 30 are different from each other in the shapes of the portions regulated by the position regulating portions, the through-holes extending in the vertical direction, and the groove-shaped notches extending through the inner diameter side. However, in different types of orifice members 57, the portions regulated by the position regulating portions may be through-holes that extend in the vertical direction or groove-shaped notches that extend through the inner diameter side.

For example, even if different types of orifice members 57 each have a pair of through-holes extending in the vertical direction, for example, the outer widths are different so that the mutual position regulating portions are not inserted into the other through-holes.

Further, even if different types of orifice members are similarly positioned by the position regulating portion and are seated on the placing table 3 over the entire circumference of the orifice member 57, the height positions in the vertical direction may be different. Analyzing the difference in vertical position makes it possible to determine whether or not the orifice member 57 placed on the placing table 3 corresponds to the placing table 3 and is the orifice member 57 to be incorporated in the liquid-sealed mount rubber 50 to be manufactured.

Note that the present invention is not limited to the configuration described in the above embodiment, and various changes can be made.

What is claimed is:

1. An orifice member placing table on which a first orifice member to be incorporated in a liquid chamber of a liquid-sealed vibration-proof mount is placed, the placing table comprising:
    a measuring unit that measures a vertical position of the first orifice member placed on the placing table;
    a position regulating portion that engages with a part of the first orifice member; and
    an orifice member determination unit that determines a placed state of the first orifice member and a type of the first orifice member based on a measurement result obtained by the measuring unit,
    wherein when the first orifice member is placed in a correct posture, the position regulating portion engages with the first orifice member and seats the first orifice member on the placing table over an entire circumference of a lower end portion of the first orifice member, and
    when a second orifice member different, at least, in shape from the first orifice member is placed or when the first orifice member is placed in an incorrect posture, the position regulating portion does not engage with the second orifice member or the first orifice member placed in the incorrect posture and lifts at least a part of the second orifice member or the first orifice member placed in the incorrect posture from the placing table.

2. The orifice member placing table according to claim 1, wherein
    the first orifice member includes a through-hole extending through the first orifice member in a thickness direction and a partition wall that partitions the first orifice member in the thickness direction at a position displaced to an opposite side to the placing table relative to a central portion in the thickness direction while the first orifice member is placed on the placing table in a correct posture, and
    the position regulating portion includes a positioning pin that engages with the through-hole and a lifting pin that does not interfere with the partition wall when the first orifice member is positioned by the positioning pin and placed in a correct posture, and interferes with the partition wall and lifts the second orifice member or the first orifice member placed in the incorrect posture from the placing table when the second orifice member is placed or the first orifice member is placed in an incorrect posture.

3. The orifice member placing table according to claim 1, wherein
    the first orifice member includes a notch formed in one end portion located on a first side in the thickness direction so as to be notched in a groove shape, with the first side opening to an inside of the first orifice member in a direction orthogonal to the thickness direction, and
    the position regulating portion engages with the notch when the first orifice member is placed in a correct posture, and interferes with a second end portion located on the second end side in the thickness direction of the first orifice member and lifts the second orifice member or the first orifice member placed in the incorrect posture from the placing table when the second orifice member is placed or the first orifice member is placed in an incorrect posture.

4. An orifice member placing method comprising:
placing the first orifice member on the orifice member placing table according to claim 1;
measuring a height of the first orifice member on the placing table by using the measuring unit; and
determining a placed state of the first orifice member based on a measurement result obtained by the measuring unit.

5. A liquid-sealed vibration-proof mount manufacturing method comprising:
preparing a rubber member in which the liquid chamber is formed and the first orifice member to be incorporated in the liquid chamber;
placing the first orifice member on the placing table by the orifice member placing method defined in claim 4; and
holding the placed first orifice member and incorporating the first orifice member in the liquid chamber of the rubber member.

\* \* \* \* \*